United States Patent
Chillar et al.

(10) Patent No.: US 10,018,972 B2
(45) Date of Patent: Jul. 10, 2018

(54) ECONOMIC OPTIMIZATION OF POWER GENERATION SYSTEM WITH ALTERNATIVE OPERATING MODES

(71) Applicant: General Electric Company, Schenectady, NY (US)

(72) Inventors: Rahul Jaikaran Chillar, Atlanta, GA (US); Ernest George Cusick, Schenectady, NY (US); Julio Enrique Mestroni, Marietta, GA (US); Charles Steven Renfro, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 1012 days.

(21) Appl. No.: 14/300,966

(22) Filed: Jun. 10, 2014

(65) Prior Publication Data

US 2015/0355606 A1    Dec. 10, 2015

(51) Int. Cl.
*G05B 13/02* (2006.01)
*G05F 1/66* (2006.01)
(Continued)

(52) U.S. Cl.
CPC ............ *G05B 13/021* (2013.01); *G05F 1/66* (2013.01); *G06Q 10/06* (2013.01); *G06Q 50/06* (2013.01); *Y02E 40/76* (2013.01); *Y04S 10/545* (2013.01)

(58) Field of Classification Search
CPC ........ G05B 13/021; G05F 1/66; G06Q 10/06; G06Q 50/06; Y02E 40/76; Y04S 10/545
See application file for complete search history.

(56) References Cited

U.S. PATENT DOCUMENTS

| 8,234,876 B2 | 8/2012 | Parsonnet et al. |
| 8,706,650 B2 | 4/2014 | Ozog |

(Continued)

FOREIGN PATENT DOCUMENTS

| EP | 2151904 A2 | 2/2010 |
| KR | 20140036021 A | 3/2014 |

OTHER PUBLICATIONS

M. Munasinghe, "Principles of modern electricity pricing," in Proceedings of the IEEE, vol. 69, No. 3, pp. 332-348, Mar. 1981.*

(Continued)

*Primary Examiner* — Daniel Vetter
*Assistant Examiner* — Scott Michael Tungate
(74) *Attorney, Agent, or Firm* — Ernest G. Cusick; Hoffman Warnick LLC (57) ABSTRACT

Embodiments of the present disclosure provide an apparatus including: a controller communicatively coupled to a power generation system and configured to shift the power generation system between a first operating mode and a second operating mode, the second operating mode being different from the first operating mode; and a economic optimization engine in communication with the controller, wherein the economic optimization engine calculates: an economic benefit for shifting the power generation system from the first operating mode to the second operating mode based on at least one of a power generation demand, a power generation cost, and an operating condition of the power generation system; and a billing rate per unit of time of operation in the second operating mode based on at least one of the economic benefit, an operating difference between the first operating mode and the second operating mode, and a predetermined cost differential.

20 Claims, 7 Drawing Sheets

(51) Int. Cl.
*G06Q 10/06* (2012.01)
*G06Q 50/06* (2012.01)

(56) References Cited

U.S. PATENT DOCUMENTS

| | | | |
|---|---|---|---|
| 2004/0037697 A1* | 2/2004 | Sanborn | F02C 9/00 |
| | | | 415/118 |
| 2005/0246039 A1* | 11/2005 | Iino | G05B 13/042 |
| | | | 700/29 |
| 2010/0318237 A1 | 12/2010 | Maglaque | |
| 2012/0095809 A1 | 4/2012 | Abe et al. | |
| 2012/0130556 A1 | 5/2012 | Marhoefer | |
| 2014/0157027 A1 | 6/2014 | Tsai et al. | |
| 2014/0225445 A1 | 8/2014 | Hanada | |
| 2014/0330695 A1* | 11/2014 | Steven | G06Q 30/0283 |
| | | | 705/37 |

OTHER PUBLICATIONS

PCT Search Report and Written Opinion issued in connection with corresponding Application No. PCT/US2015/034645 dated Aug. 20, 2015.

\* cited by examiner

ECONOMIC OPTIMIZATION OF POWER GENERATION SYSTEM WITH ALTERNATIVE OPERATING MODES

BACKGROUND OF THE INVENTION

The disclosure relates generally to economic optimization of power generation systems. More particularly, the disclosure relates to apparatuses, methods, and program products for the economic optimization of a power generation system by analyzing alternative operating modes, and calculating an economic benefit and a billing rate per unit of time of operation in one of the alternative operating modes.

In the energy industry, power generation systems (e.g., turbomachinery such as gas turbines, steam turbines, wind turbines, etc.) can be sold to a prospective operator with an accompanying long-term service agreement. The power generation systems sold with these agreements are typically configured to operate in a specific mode or group of operating phases corresponding to the expected demands of the power generation system. These expected demands may be determined at the time of purchase and relied upon throughout the useful life of the power generation system. As used herein, the term "economic optimization" refers to delivering a power output from a power generation system which substantially meets the actual customer demand without significant excess power generation or shortfalls. In addition, "economic optimization" can include minimizing the degradation and fuel consumption of a power generation system to reduce wear on individual parts and the system itself during operation.

Through long-term service agreements, a servicer of the power generation system (whether the original manufacturer or a different entity) can maintain and/or repair components of a power generation system, with the system typically being taken offline for a predetermined maintenance outage interval at the time of service. Maintenance outage intervals provide regular revenue opportunities for the servicer of the power generation system but represent lost revenue and periodic, sometimes unpredictable costs to the customer. Thus, the servicer of a power generation system may have different interests from the operator. As the demand for energy from both traditional and alternative sources increases, both operators and servicers have an interest in further increasing the return on their investments.

BRIEF DESCRIPTION OF THE INVENTION

Apparatuses, systems, and program products for optimizing a power generation system with alternative operating modes are discussed. Although embodiments of the disclosure are discussed by example herein relative to power generation systems, including turbomachines as specific examples, it is understood that embodiments of the present disclosure may be applied to other situations, e.g., other types of machinery with fluctuating power output demands.

A first aspect of the invention provides an apparatus. The apparatus can include a controller communicatively coupled to a power generation system and configured to shift the power generation system between a first operating mode and a second operating mode, the second operating mode being different from the first operating mode; and an economic optimization engine in communication with the controller, wherein the economic optimization engine calculates: an economic benefit for shifting the power generation system from the first operating mode to the second operating mode based on at least one of a power generation demand, a power generation cost, and an operating condition of the power generation system; and a billing rate per unit of time of operation in the second operating mode based on at least one of the economic benefit, an operating difference between the first operating mode and the second operating mode, and a predetermined cost differential.

A second aspect of the invention provides a method including: calculating an economic benefit of shifting a power generation system from a first operating mode to a second operating mode, the second operating mode being different from the first operating mode, wherein the economic benefit is based on at least one of an operating condition of the power generation system, a power generation demand, and a power generation cost; calculating a billing rate per unit of time of operating the power generation system in the second operating mode based on at least one of the economic benefit, an operating difference between the first operating mode and the second operating mode, and a predetermined cost differential; and generating an economic impact vector for integrating the economic benefit and the billing rate per unit of time with a summary of the second operating mode.

A third aspect of the invention provides an program product stored on a computer readable storage medium for economic optimization of a power generation system, the computer readable storage medium comprising program code for causing a computer system to: calculate an economic benefit of shifting the power generation system from a first operating mode to a second operating mode, the second operating mode being different from the first operating mode, wherein the economic benefit is based on at least one of an operating condition of the power generation system, a power generation demand, and a power generation cost; calculate a billing rate per unit of time of operating the power generation system in the second operating mode based on the economic benefit, an operating difference between the first operating mode and the second operating mode, and a predetermined cost differential; and generate an economic impact vector for integrating the economic benefit and the billing rate per unit of time with a summary of the second operating mode.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As discussed herein, aspects of the invention relate generally to the economic optimization of a power generation system with at least two operating modes. More particularly, as discussed herein, aspects of the invention relate to apparatuses, systems, and program products for the economic optimization of a power generation system. Embodiments of the present disclosure allow an operator of a power generation system to increase revenues and/or decrease costs by shifting the power generation system to an alternative operating system. The present disclosure also allows a servicer of the power generation system to advise the operator of opportunities for economic optimization, and to calculate a billing rate to the operator for providing this information.

Figure 1:
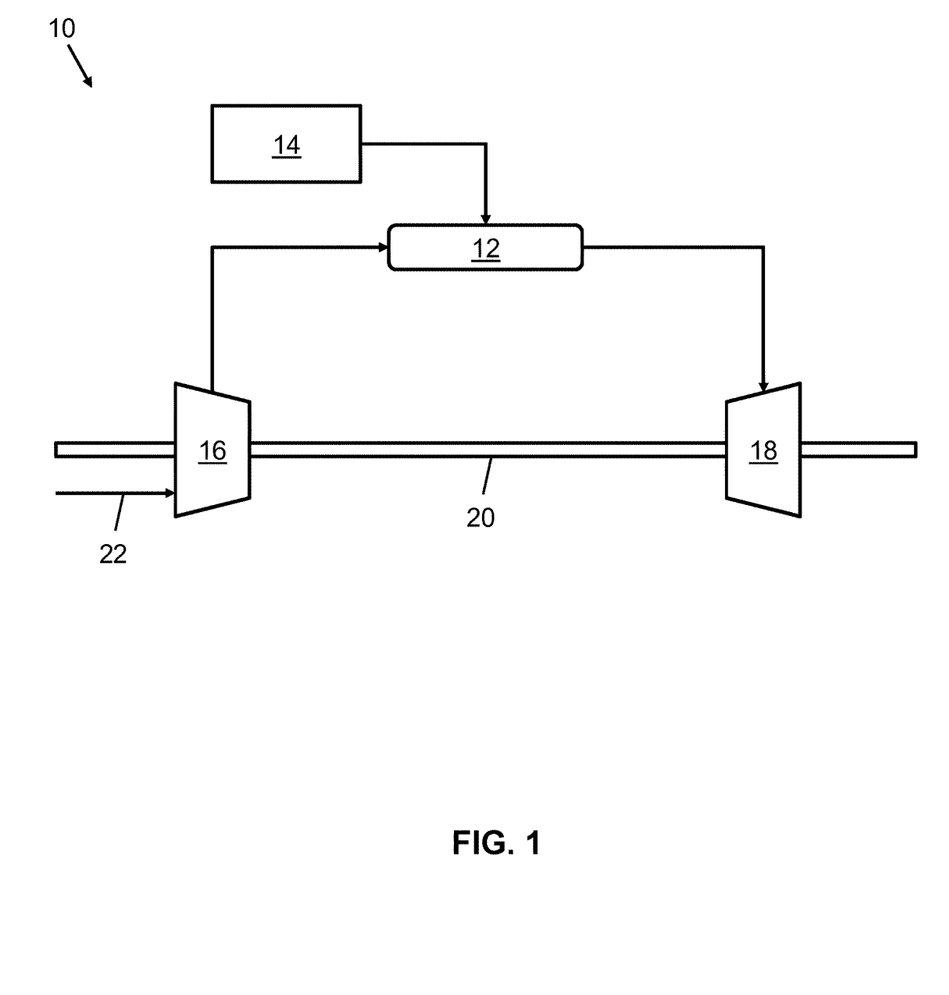
FIG. 1 is a schematic view of power generation system in the form of a turbomachine.

Referring to FIG. 1, a power generation system 10 in the form of a turbomachine is shown. Power generation system 10 is shown by example as being a combustion-based turbomachine assembly, though embodiments of the present disclosure can also be used with other types of turbomachines (steam turbines, wind turbines, water turbines, etc.). In combustion-based turbomachines, a combustor 12, connected to a fuel nozzle 14, is typically located between the compressor 16 and turbine 18 sections of power generation system 10. Compressor 16 and turbine 18 can be mechanically coupled to each other through a rotatable shaft 20. Air 22 flows sequentially through compressor 16, combustor 12, and lastly through turbine 18. Fuel nozzle 14 can provide fuel which combusts in the presence of air 22 in combustor 12 to yield a hot gas stream. The hot gas stream can enter turbine 18 to impart mechanical energy to rotatable shaft 20, thereby delivering power back to compressor 16 and/or any loads (not shown) coupled to rotatable shaft 20. Power generation system 10 may be one of several individual turbomachines subject to the same operator and/or part of a larger power generation system.

Figure 2:
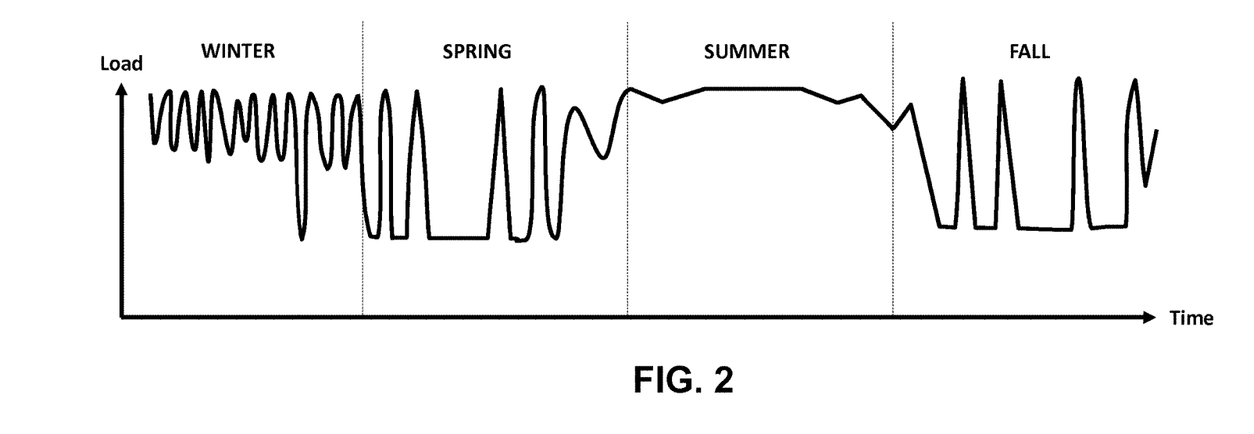
FIG. 2 is a plot of an example seasonal demand profile on a power generation system.

Turning to FIG. 2, a seasonal demand profile for an example power generation system is shown. In the example of FIG. 2, a power generation system may experience highly volatile power generation demands in winter, with the power generation system needing to transition flexibly between different power outputs and perform efficiently during these transitions. In spring and fall, the demand for generated power may generally be stable aside from random spikes in demand, thereby favoring flexibility and the capacity for larger power outputs. In summer, however, demand may be both relatively high and stable, thereby favoring a constant power output, and long-term reliability of the system and its parts. As economic factors in the energy industry continue to change (e.g., customer demand, the cost of alternative energy sources, emissions standards, fuel costs, etc.), seasonal demand on individual power generation systems, such as gas turbines, has become increasingly volatile. This increased volatility can increase the differences in demand during a particular season, and from season-to-season.

Gas turbines and similar power generation systems can be used in a variety of alternate modes, either with a constant or variable output, to meet different types of demand. A contrasting group of systems include "base load power plants." Base load power plants are designed to provide a constant supply of power to meet all or a portion of a given area's demands, and may include nuclear, coal, hydroelectric, geothermal, or similar types of power plants. Although gas turbines and similar power generation systems can also produce a constant power output, they can alternatively act as "load following power plants." Load following power plants refer to power plants which adjust their power output over a predetermined time, sometimes with a particular amplitude and frequency, to meet changing demands for electricity throughout the day. In addition, load following power plants such as gas turbines and similar power generation systems can remain offline until periods of peak demand occur.

Figure 3:
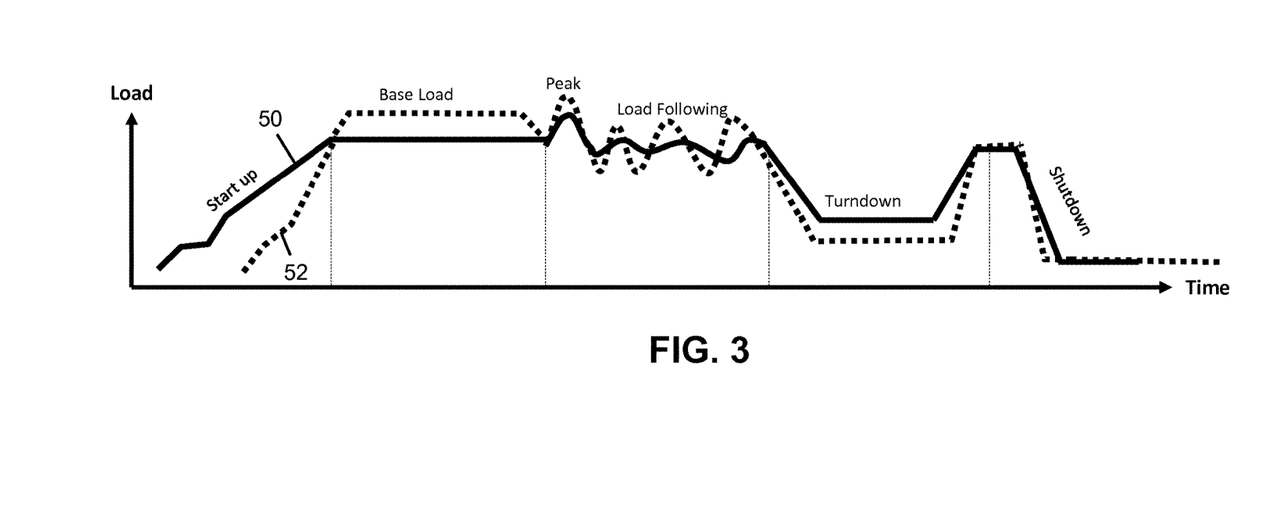
FIG. 3 is a plot of load versus time for a power generation system in several operating phases according to an embodiment of the present disclosure.

Referring now to FIG. 3, a plot of load versus time for a power generation system transitioning through several operating phases is shown. Although each phase is shown by example as occurring in a particular chronological order, it is understood that different phases can be repeated or may occur in a different order. Throughout operation, the load on power generation system 10 (FIG. 1) can increase and decrease, with each phase having different characteristics and corresponding power outputs. In addition, different phases of operation may change the demand on individual components or parts of the power generation system. This demand can be referred to as the "part-specific demand." A plot of load over time for a power generation system in a first operating mode 50 is shown for the purposes of illustration.

The start up phase refers to the transient operating state between the system being turned on and reaching a desired state. During start up, the power generation system in first operating mode 50 approaches its base load at predetermined rate of change over time, which can be referred to as a "load profile." The load profile (e.g., the rate at which load increases over time) can be known as the power generation system's start up speed. Different load profiles will have different corresponding start up speeds, and increasing the start up speed will generally sacrifice a corresponding amount of efficiency. The optimal load profile during start up for an expected demand emphasizes flexibility (to meet changing demands) and reliability (to avoid causing a failure from excessive demands on the system). The start up speed for first operating mode 50 can be based on an anticipated demand and power output from the power generation system.

In the base load phase, power generation system 10 (FIG. 1) can output a constant amount of power to meet a stable level of demand, thereby fulfilling the role of a base load power plant. The load profile of the base load phase, as shown in FIG. 3, allows the power generation system to provide a substantially constant power output. The base load operating phase may be suitable for meeting consistent, stable customer demands on the power generation system. The constant load profile for the base load phase favor efficiency and reliability, while maintaining the capacity to reduce the power output to a fraction of the base load. Power generation system 10 (FIG. 1) may have a predetermined maximum load (peak value) during operation. To compensate for unexpected demand increases, including system shocks, environmental events, etc., the peak value may be set to a level which prevents power generation system 10 (FIG. 1) and/or its parts from sustaining excessive damage when operating at high loads. The predetermined peak value may be less than the actual maximum power output which power generation system 10 (FIG. 1) can produce.

The load following phase refers to a phase in which the load on the power generation system fluctuates due to changing customer demands. Here, power generation system 10 (FIG. 1) acts as a load following power plant. In this case, the power generation system may shift between loads with a predetermined frequency and amplitude to meet anticipated changes in demand throughout a timespan. The load profile of the load following phase may provide speed, efficient operation, and the ability to reach peak load value or greater/lower power outputs quickly in response to an unexpected increase in demand.

In cases of a reduced, constant demand, the power generation system may operate in a "turndown phase," also known as a reduced base load. The turndown phase refers to an operating phase of power generation system 10 (FIG. 1) for producing a constant power output that is lower than the base load. When operating in turndown phase, the power generation system can operate at between approximately 0% and approximately 100% of the base load value. When demand is anticipated to be significantly below the predetermined demand for the base load operating phase, continuing to operate at base load would generate more power than is needed. Parts of the power generation system may degrade more quickly at higher loads and variable costs (such as fuel costs, water use costs, etc.) may be higher than is needed. In the turndown phase, the load profile is chosen to minimize predicted emissions and prioritize efficiency over flexibility and speed.

To deactivate power generation system 10 (FIG. 1), the system may enter a shutdown phase for deactivating the system. During shut down, the power output and load can decrease at a predetermined rate until operations cease. The load profile for shut down can be based on a remaining demand on the power generation system during shut down, and to avoid damage or failure of the system and/or its parts.

Although operating mode 50 includes a range of predetermined loads and load profiles for different circumstances, the various tradeoffs at each stage (output versus efficiency, flexibility versus reliability, emissions levels versus speed of load increase, etc.) are specific to operating mode 50. With customer demand and other factors becoming increasingly volatile, applicants have discovered that operating power generation system 10 (FIG. 1) in operating mode 50 may be economically sub-optimal. That is, applicants have discovered that one or more hypothetical second operating modes 52 (shown in phantom), with different loads and load profiles, may provide a greater economic benefit to the operator of the same power generation system when significant changes in demand or costs occur. As used herein, "economic benefit" refers to the total increase in revenue and decrease in costs from shifting the power generation system to a different operating mode. The economic benefit can be expressed in dollars and may include, e.g., the combined total of some or all of the increased customer revenue, fuel cost savings, decrease in repair costs, revenue from longer operating intervals between outages, and/or other types of savings and revenue increases which result from an optimized operating mode. Embodiments of the present disclosure, as discussed herein, define at least one second operating mode 52 which modifies various aspects of the power generation system (e.g., load profiles, base load, peak load, start up speeds, etc.) and evaluate whether the power generation system can be optimized by switching from first operating mode 50 to second operating mode 52.

Figure 4:
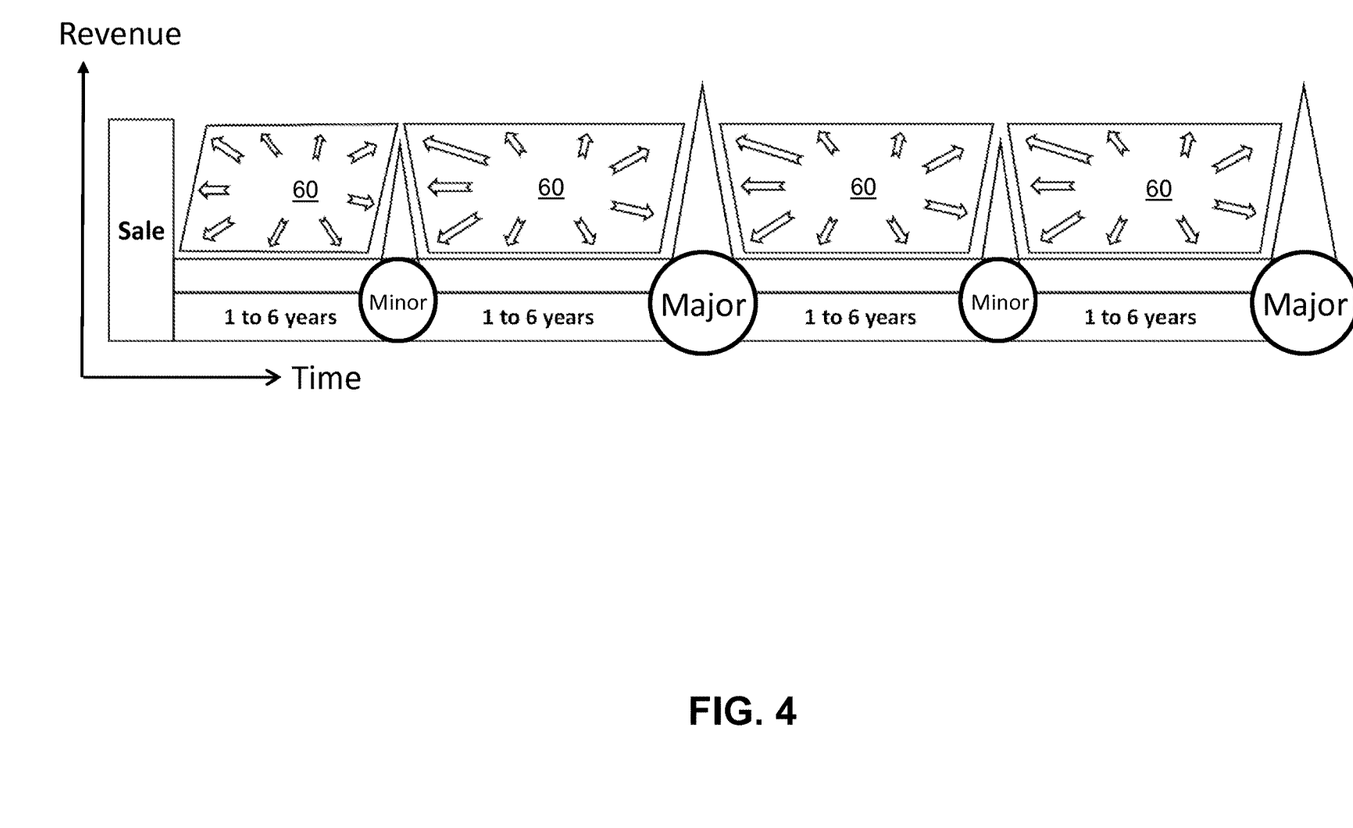
FIG. 4 depicts a revenue timeline for a servicer of a power generation system according to embodiments of the present disclosure.

Referring to FIG. 4, an example revenue timeline for a servicer of a power generation system is shown. As discussed herein, changes in consumer demand for a particular power generation system create an economic opportunity for operators the power generation system and consumers of energy. The economic opportunities for an operator of the power generation system may be aligned with the servicer's potential economic opportunities. Typically, a servicer can sell a power generation system to an operator (customer) and/or establish a long-term service agreement. Under the long-term service agreement, the servicer and operator can agree for the servicer to service and maintain the power generation system at regular intervals. In some cases, system shocks, environmental events, etc., may cause the power generation system to suffer minor outages (e.g., ancillary parts failing) or major outages (e.g., a temporary failure of the entire system). These outages, marked with the terms minor and major in FIG. 4, can occur at irregular intervals, and as an example can be between approximately one to six years apart from each other. Though revenue is realized for the servicer through the long-term service agreement at the time of these outages, this model creates an uneven revenue stream for the servicer and may cause the operator of the power generation system to experience significant costs and lost profits at the time of service. Applicants have discovered that the servicer can cooperate with the operator to realize several economic opportunities 60 for both parties after the time of sale. Embodiments of the present disclosure capture economic opportunities 60 for the servicer and the operator of the power generation system by increasing revenues and/or reducing the occurrence of major outages, system failures, etc.

Figure 5:
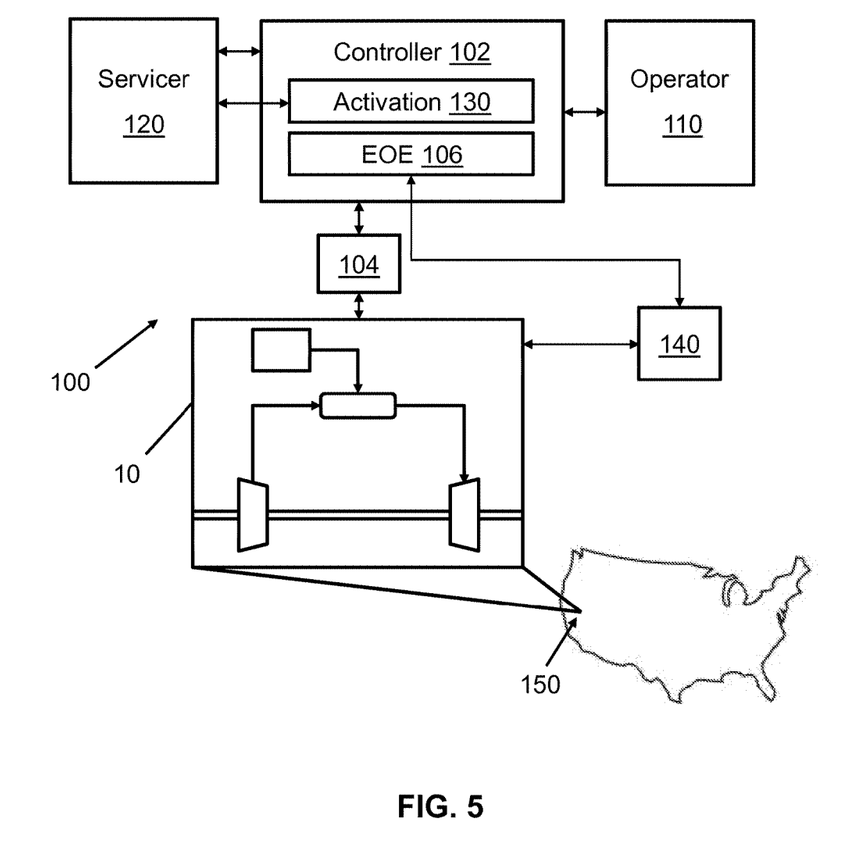
FIG. 5 is a schematic diagram of an apparatus according to an embodiment of the present disclosure.

Turning to FIG. 5, an apparatus 100 according to an embodiment of the present disclosure is shown. Apparatus 100 can include a controller 102 communicatively coupled to power generation system 10. More specifically, power generation system 10 can include or be communicatively coupled to an internal control system (ICS) 104, which may include or be embodied as a computing device for operating power generation system 10. ICS 104 can set, e.g., values of peak load, start up speed, frequency/amplitude for demand cycles of power generation system 10, load profiles, and/or the other physical variables for operating power generation system 10 discussed herein. In embodiments of the present disclosure, as described herein, controller 102 can manipulate, modify, control, etc., ICS 104 to affect the performance of power generation system 10. In some embodiments, controller 102 can be part of ICS 104 or vice versa.

ICS 104 can set a particular operating mode for power generation system 10. ICS 104 can shift power generation system 10 from a "first operating mode" to a "second operating mode" (i.e., first operating mode 50 (FIG. 3) to second operating mode 52 (FIG. 3)). The first operating mode may be an operating mode for power generation system 10 with predetermined base load values, peak load values, load profiles, start up speeds, fuel consumption rates, etc., that may be agreed-to between the operator and servicer of power generation system 10 at the time of purchase. The second operating mode can be one of several alternative operating modes with a different value for one or more of the predetermined variables, though one or more of these variables may be the same as in the first operating mode. Controller 102 can shift power generation system 10 to different operating modes by sending control signals to ICS 104 and/or controllable components of power generation system 10 to perform actions such as opening valves, activating and deactivating particular ancillary parts, or other actions discussed elsewhere herein. In addition or alternatively, settings for at least one second operating mode can be predetermined and stored in ICS 104, and control signals from controller 102 can cause ICS 104 to shift between its first operating mode and one of several second operating modes. The first operating mode may represent a current or default operating mode for power generation system 10, and the second operating mode can represent an alternative which may increase the economic benefits for operating power generation system 10 when appropriate for current demand levels and/or other factors. In some cases, the first operating mode may be an operating mode which was originally selected and shifted-to as a second operating mode.

To compute the benefits and costs of shifting power generation system 10 to the second operating mode, controller 102 can include an economic optimization engine (EOE) 106. EOE 106 can be embodied as dedicated hardware or software for computing the benefits and costs to an operator for shifting power generation system 10 to the second operating mode. As used herein, the term "operator" refers to a person or party which operates power generation system 10. The operator may be a customer when purchasing power generation system 10 and/or purchasing a service agreement from a servicer, but may be a seller with respect to the eventual customers who purchase power generated with power generation system 10. EOE 106 can include several algorithms, data sets, look up tables, and/or programming instructions for carrying out the methods disclosed herein, and will be discussed in further detail in the discussion accompanying FIG. 6. The economic benefit for shifting power generation system 10 from the first operating mode to the second operating mode can be calculated in EOE 106. EOE 106 can use several factors to compute the economic benefit, including without limitation: a power generation demand, a power generation cost, and an operating condition of the power generation system. The "power generation demand" refers to the total customer demand on power generation system 10, which can be expressed as a total amount of power (expressed, e.g., in kilowatts (kW) or kilowatt hours (kWh)), a power output profile measured over a period of minutes, hours, days, months, etc. The power generation demand can also be multiplied by the revenue per unit of generated power and be expressed a currency value of meeting customer demands.

The "power generation cost" can include the fuel and/or operating expenses for generating a particular power output with power generation system 10, and can be expressed in terms of currency, e.g., U.S. dollars, British pounds, Euros, etc. The power generation cost can additionally or alternatively include a cost savings or cost increase relative to available alternatives, including other power generation systems 10 controlled by the same operator or a competitor. EOE can also factor an operating condition of the power generation system into the calculated economic benefit. As used herein, the "operating condition" can include a variable which measures the current performance of power generation system 10, including but not limited to, the properties of the current operating phase (e.g., start up, base load, peak load, load following, turndown, shutdown, etc.), the remaining operating time until the next anticipated outage, the current load demands, the type and condition of parts being used, etc. The operating condition can also include the output or performance of power generation system 10, such a system-level or part-specific power output, a start up or transition speed, etc. The operating condition can also include projected maintenance costs for exceeding predefined limits, e.g., the costs of producing a greater power output than the predetermined peak value. In one illustrative example, the economic benefit can be expressed as a monetary value for increasing from, e.g., a 365 megawatt (MW) base load in the first operating mode to a 380 MW base load in the second operating mode with a fuel cost of $15 per one million British Thermal Units, or "BTUs" ($15/MMBTU) and a $125 cost per megawatt hour (MWh) of exceeding the base load (i.e., an operating condition) can generate an economic benefit of $771 per hour in revenue for the operator of power generation system 10.

In addition to calculating an economic benefit, EOE 106 can also calculate a billing rate per unit of time for operating power generation system 10 in the second operating mode. The billing rate per unit of time can represent, e.g., a cost to the operator of power generation system 10 of realizing the economic benefit of the second operating mode. The billing rate per unit of time can also represent a revenue to the servicer of power generation system 10 and/or apparatus 100. The billing rate per unit of time can be based on several factors including without limitation: the calculated economic benefit, an operating difference between the first operating mode and the second operating mode, and a predetermined cost differential. The "operating difference" between the first and second operating modes can include, e.g., increases or decreases in fuel or labor costs, a projected cost increase or monetary savings to the servicer resulting from power generation system 10 wearing out more quickly (e.g., from meeting an increased demand) or less quickly (e.g., from decreasing the base load, power output, etc.), or other factors related to or arising from operation. The operating difference can also include the costs of remotely maintaining power generation system 10 in the second operating mode. The "predetermined cost differential" can be a predetermined, negotiated service cost per unit of time for providing the option of operating the second operating mode. In an illustrative example, the billing rate per unit of time can include a predetermined cost differential of $120 per hour for an economic benefit of $771 per hour (after each factor is converted to an amount of currency per hour). In addition, the billing rate per unit of time can include a $30 per hour cost increase for maintaining the power generation system in the second operating mode, which can be calculated by, e.g., predicting an amount of damage to a particular part per unit of time and converting this amount of damage into a monetary value. The billing rate per unit of time may also include a $100 per hour of expected maintenance cost increases, which may be calculated by reference to a table or formula for calculating maintenance cost increases resulting from changing the demand on power generation system 10. These expected costs can be summed together for a total billing rate per unit of time of $250 per hour.

Controller 102 and EOE 106, while providing these features, can be in communication with an operator 110 and a servicer 120 to provide a stream of information regarding the second operating mode and/or other alternative operating modes. Embodiments of apparatus 10 can enhance the partnership between operator 110 and servicer 120 by providing additional features in controller 102. For example, to prevent poor timing of running power generation system 10 in other operating modes, controller 102 can include an activation module 130, which may be in the form of hardware or software for controlling whether controller 102 can dispatch signals to ICS 104 or power generation system 10. Operator 110 can submit a request to servicer 120, either through controller 102 or another channel of communication to request shifting power generation system 10 to a second operating mode. Where the economic benefit calculated with economic optimization engine 106 is a net gain to operator 110 and/or servicer 120, servicer 120 can approve the request (i.e., by issuing a command to an independent system) and send a signal to activation module 130 to shift power generation system 10 to the second operating mode.

In addition to the factors previously set out for determining an economic benefit and billing rate per unit of time, controller 102 can base its determination on additional sources of data. For example, a system health monitor 140 may be communicatively connected to both power generation system 10 and controller 102. System health monitor 140 may include a measuring tool or measuring system for calculating the physical condition of power generation system 10 and/or any of its components. System health monitor 140 may include machinery such as a boroscope for optically measuring variables such as clearance or material deformation, a stress/strain gauge for monitoring the condition of materials, a thermometer for measuring the internal temperature of power generation system 10, etc. Algorithms, formulas, look up tables, etc. stored within system health monitor 140 and/or controller 102 can calculate measures of system health from measurements taken with system health monitor 140 and references to correlative data. These measurements can include, e.g., a time until the next outage or failure, measures of mechanical degradation such as stress, strain, etc., changes in efficiency and/or fuel consumption over time, and other currently known or later developed variables for measuring the condition of power generation system 10. EOE 106 of controller 102 can factor these measurements into the calculated economic benefit and/or billing rate per unit of time, e.g., by considering whether the first or second operating modes increase or decrease the degradation of parts within power generation system 10.

Power generation system 10 can be associated with or provide power to a particular geographic location 150. EOE 106 can factor geographic location 150 into calculating the economic benefit and/or the billing rate per unit of time. For example, a vector data field (i.e., one data field for storing several variables) within controller 102 can include a physical location, a local fuel cost, a local demand profile, a shipping cost for replacement parts, etc. Data associated with geographic location 150 can also include multipliers for the individual variables of economic benefit and/or billing rate per unit of time. In one example, three power generation systems may serve a particular group of customers. One power generation system 10 may be at a geographic location 150 where replacement parts cost approximately 1.1 times as much money to provide to the site. Thus, the cost of increasing the load on parts of power generation system 10 at geographic location 150 can be multiplied by 1.1. Other sites servicing the same area or different areas may be affected by other location-based factors, such as fuel costs, inventory limits, labor costs, schedule restrictions, etc.

Figure 6:
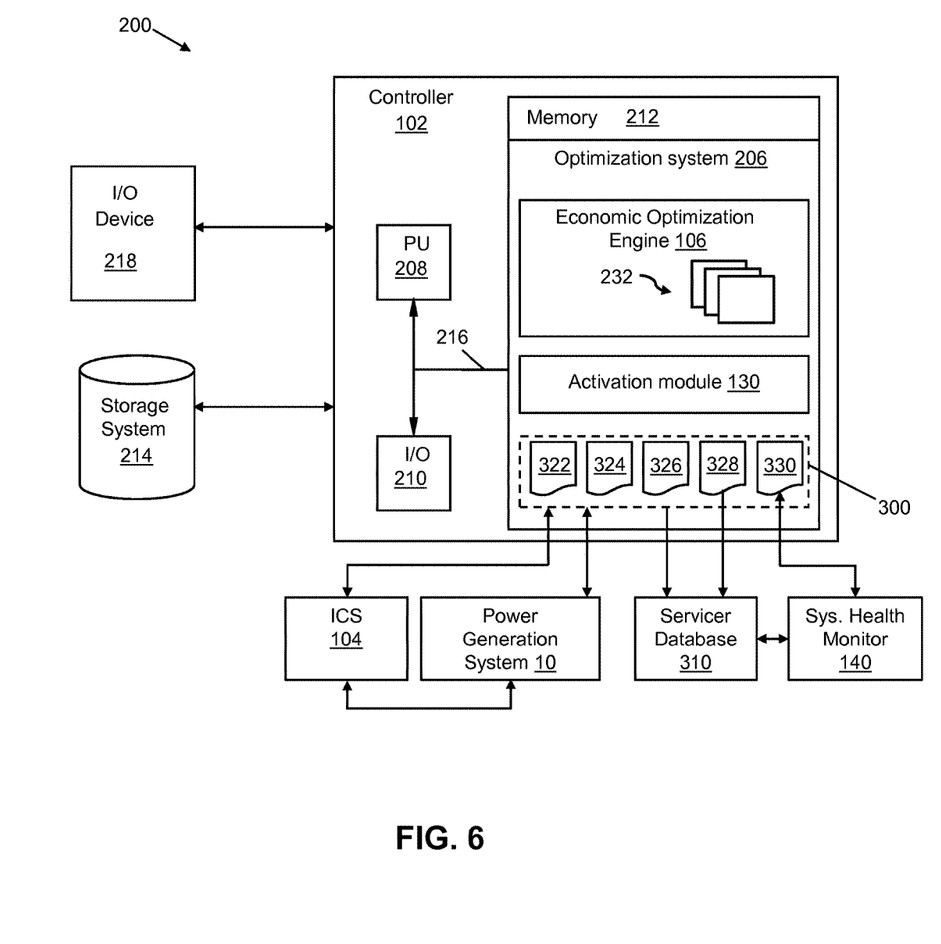
FIG. 6 is an illustrative environment which includes a computer system interacting with a power generation system according to an embodiment of the present disclosure.

Referring now to FIG. 6, an illustrative environment 200 for performing the various processes described herein is shown. In particular, controller 102 can form the entirety or part of a computer system 202. Controller 102, in turn, can include an optimization system 206. Optimization system 206 can enable controller 102 to provide economic optimization of power generation system 10 by shifting between multiple operating modes.

The components shown in FIG. 6 are one embodiment of a system according to embodiments of the present disclosure. As discussed herein, controller 102 can provide information to a human or computerized user to provide economic optimization of power generation system 10 by shifting between multiple operating modes. A technician may operate embodiments of the present disclosure manually, automatically by controller 102, and/or by a combination of a technician and controller 102. It is understood that some of the various components shown in FIG. 6 can be implemented independently, combined, and/or stored in memory for one or more separate computing devices that are included in controller 102. Further, it is understood that some of the components and/or functionality may not be implemented, or additional schemas and/or functionality may be included as part of optimization system 206.

Controller 102 can include a processor unit (PU) 208, an input/output (I/O) interface 210, a memory 212, and a bus 216. Further, controller 102 is shown in communication with an external I/O device 218 and a storage system 214. Memory 212 can include economic optimization engine 106 and activation module 130 therein. In addition, economic optimization engine 106 can include several modules 232 for executing particular functions, e.g., determining, comparing, calculating, encoding, decoding, etc., and can use algorithm-based calculations, look up tables, and similar tools stored in memory 212 for processing, analyzing, and operating on data to perform their respective functions. In general, PU 208 can execute computer program code to run software, such as optimization system 206, which can be stored in memory 212 and/or storage system 214. While executing computer program code, PU 208 can read and/or write data to or from memory 212, storage system 214, and/or I/O interface 210. Bus 216 can provide a communications link between each of the components in controller 102. I/O device 218 can comprise any device that enables an operator to interact with controller 102 or any device that enables controller 102 to communicate with the equipment described herein and/or other computing devices. I/O device 218 (including but not limited to keyboards, displays, pointing devices, etc.) can be coupled to computer system 202 either directly or through intervening I/O controllers (not shown).

Memory 212 can also include various forms of data 300 pertaining to one or more machines and/or machine systems. Data 300 can be sent to, received from, or otherwise exchanged with other components by any currently known or later developed data exchange system. In an embodiment, controller 102 can communicate with power generation system 10, internal control system (ICS) 104 of power generation system 10, system health monitor 140, and/or a servicer database 310 accessible to servicer 120. For the purposes of discussion, specific items of data 300 are discussed herein. However, it is understood that other types of data, including intermediate forms of data, may be created, stored, adjusted, sent, received, etc. during intermediate steps not specifically discussed. An economic benefit data field 322 can include one or more values of economic benefit calculated with apparatus 100 and/or process steps discussed herein. A billing rate data field 324 can include one or more values of a billing rate per unit of time in a second operating mode of power generation system 10. An economic impact vector data field 326 can include corresponding values of economic benefit and billing rate per unit of time, in addition to other values of these same items for multiple operating modes of power generation system 10. A request data field 328 can include requests to be sent to controller 102, e.g., with I/O device 218. Controller 102 can send requests recorded in request data field 328, such as a request to operate power generation system 10 in a particular operating mode, to servicer database 310. A system health data field 330 can include values of system health (e.g., stresses, strains, clearances, temperatures, etc.) measured with system health monitor 140 and provided to controller 102.

Controller 102 can comprise any general purpose computing article of manufacture for executing computer program code installed by a user (e.g., a personal computer, server, handheld device, etc.). However, it is understood that controller 102 is only representative of various possible equivalent computing devices and/or technicians that may perform the various process steps of the disclosure. In addition, controller 102 can be part of a larger architecture for providing economic optimization of power generation system 10.

To this extent, in other embodiments, controller 102 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, controller 102 may include a program product stored on a computer readable storage device, which can be operative to provide economic optimization of power generation system 10 when executed.

Figure 7:
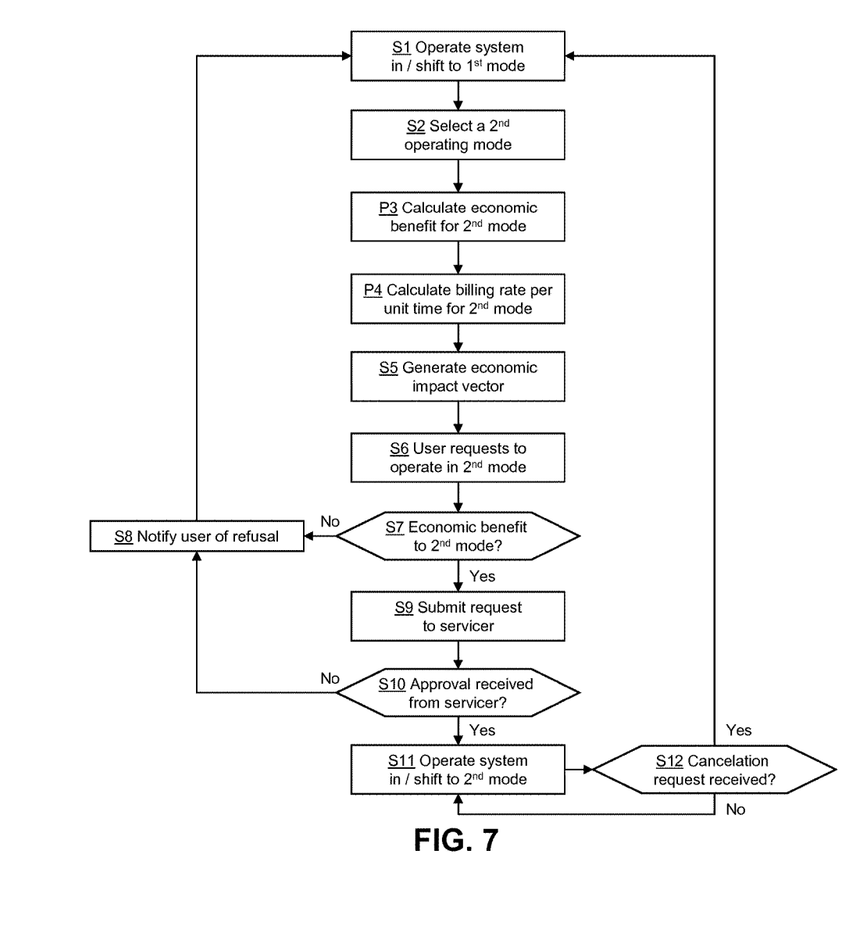
FIGS. 7 and 8 depict illustrative flow diagrams according to embodiments of the present disclosure.

Referring to FIGS. 6 and 7 together, process steps for optimizing power generation system 10, e.g., with embodiments of apparatus 100 and/or environment 200 according to embodiments of the present disclosure are shown. In step S1, power generation system 10 may operate in a first operating mode (e.g., first operating mode 50 (FIG. 3)). As discussed herein, the first operating mode may be an operating mode for power generation system 10 with predetermined base load values, peak load values, load profiles, start up speeds, fuel consumption rates, etc., that may be agreed-to between the operator and servicer of power generation system 10 at the time of purchase. Where the operator of power generation system 10 wishes to optimize the power generation, load profile, fuel use, or other aspects of power generation system 10, the operator can select a second operating mode (e.g., second operating mode 52 (FIG. 3)) in step S2. The second operating mode selected in step S2 can be one of several alternative operating modes defined in a field of data 300 within memory 212, a library of alternative operating modes in storage system 214 or servicer database 310, or a proposed operating mode defined by an operator and communicated to controller 102 through I/O device 218 as a digitally encoded command. The proposed second operating mode chosen in step S2 can include a mode with different base load values, peak load values, load profiles, fuel consumption rates, start up speeds, etc., set by adjusting power generation system 10 directly or causing ICS 104 to issue control signals to power generation system 10.

Once a second operating mode is selected, the method can proceed to process P3 for calculating an economic benefit and process P4 for calculating a billing rate per unit of time for the second operating mode of power generation system 10. Processes P3 and P4 can each include one or more particular substeps which are shown in detail in FIG. 8. Calculating an economic benefit in process P3 can include adding and/or subtracting several economic factors to provide an actual or estimated economic gain to the operator of power generation system 10. Calculating a billing rate per unit of time in process P4 can include adding and/or subtracting other factors (e.g., the cost of operating power generation system 10 in the second operating mode, a predetermined cost differential, system health costs, and/or the economic benefit calculated in process P3) to yield a cost to the operator of power generation system 10 over time. The economic benefit calculated in process P3 can be expressed in terms of a currency value gained per unit of time, and the billing rate per unit of time calculated in process P4 can be a periodic cost to the operator of power generation system 10.

Figure 8:
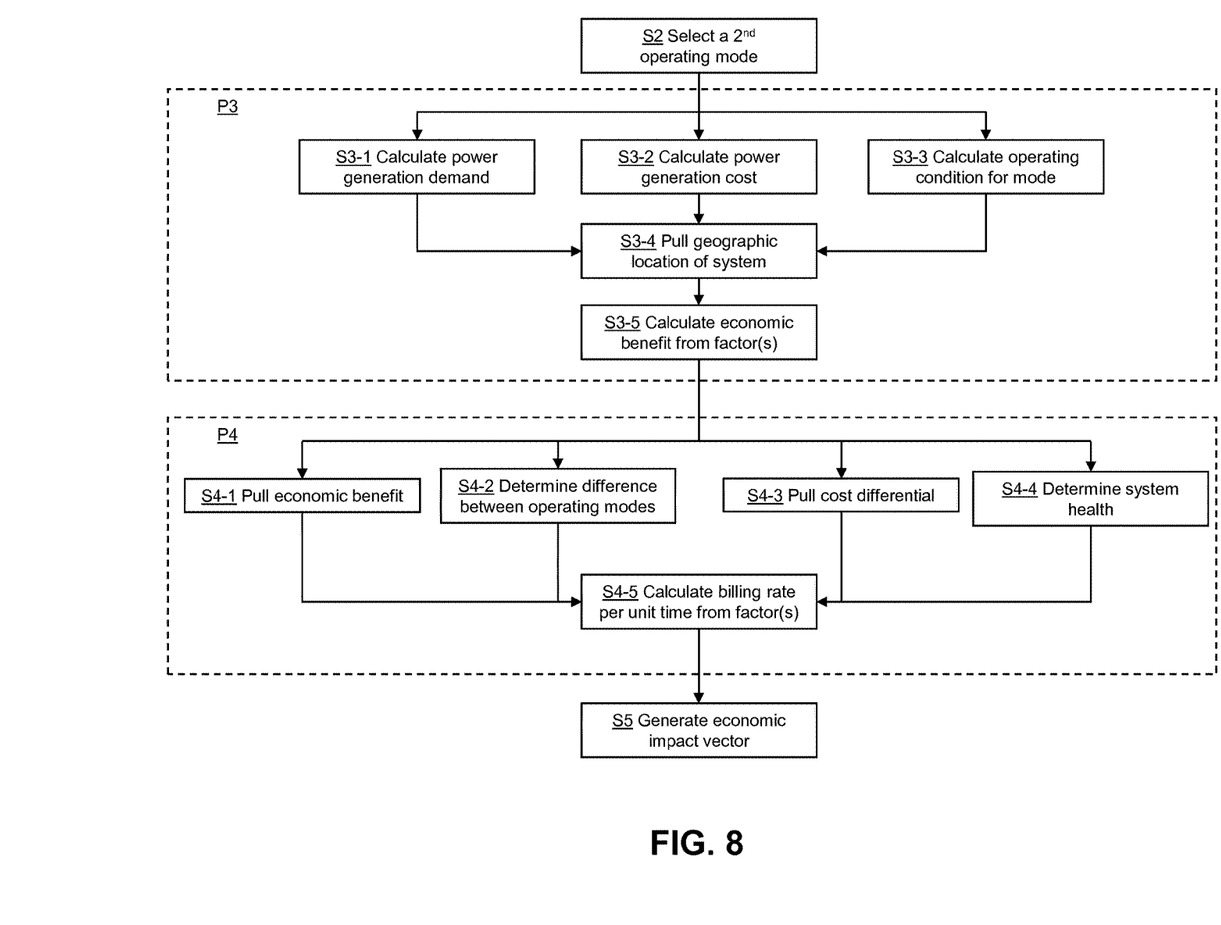

Turning now to FIGS. 6 and 8 together, example substeps of processes P3 and P4 are shown. Although some of the example substeps of processes P3 and P4 are shown as occurring in parallel for the purposes of example and illustration, it is understood that each substep of process P3 and/or process P4 can be executed in any conceivable alternative order, and that some of the steps discussed herein may be omitted or added. Following step S2 of selecting a second operating mode for power generation system 10, modules 232 of optimization system 206 can calculate several factors related to the economic benefit of the second operating mode. In step S3-1, modules 232 can calculate a "power generation demand" on power generation system 10 in the second operating mode. The power generation demand can represent a total market demand on power generation system 10 expressed in terms of power (e.g., kW or kW hours). The power generation demand can be converted into a total revenue or revenue per unit of time for meeting the power generation demand. The economic benefit can also be expressed as a total revenue increase for operating power generation system 10 in the second operating mode. Modules 232 can convert the economic benefit into a currency value by multiplying the power generation demand (e.g., in kW) by the revenue created per unit of power. In some cases, the power generation demand calculated in step S3-1 can exceed the capacity of power generation system 10 in the first operating mode but may be within the production capacity of power generation system 10 in the second operating mode. In an example, the net economic benefit can be an additional $300 per hour for increasing the power output of power generation system 10 by fifteen MW per hour to serve a particular group of customers with a greater than expected demand for generated power.

Modules 232 can calculate the cost of generating power in the second operating mode ("power generation cost"). To some extent, this power generation cost can be related to the calculated power generation demand, as meeting a higher demand may increase variable costs (e.g., the cost of fuel) needed to meet the higher demand, and vice versa. In some cases, power generation system 10 may temporarily (e.g., for a few hours, days, weeks, months, etc.) become more cost-effective than other alternative power generation systems which use other types of fuel or inputs, such as coal, nuclear materials, wind, solar, etc. The calculated power generation cost can reflect a difference in price between the fuel used in power generation system 10 and the cost of any alternative power generation systems available to operator 110, thereby adding one or more opportunity costs to the power generation cost calculated in step S3-2. The power generation cost can also include, e.g., a location-specific operating cost based on environmental factors, such as weather or disaster damage, or external economic factors, such as taxes on revenue, etc. for operating power generation system 10 in the second operating mode at geographic location 150 (FIG. 5). The second operating mode of power generation system 10 may accelerate or decelerate the wearing out of replacement parts, and shifting to the second operating mode may affect one or more part-specific operating costs for taking on different loads. The power generation cost calculated in step S3-2 can include the expected costs of changing the demand on individual parts. For example, the power generation cost of increasing the output of power generation system 10 by fifty MW per hour may require an additional $30 per hour of operation in fuel costs.

In step S3-3, modules 232 can calculate one or more operating conditions (as defined herein) of power generation system 10 in the second operating mode. The operating conditions calculated in step S3-3 can apply to the second operating mode, and may be economically related to the power output and/or profitability of the system. As one example, the calculated operating condition can include a power output of power generation system 10 in the second operating mode. The power output may be greater or less than the actual customer demand for energy from power generation system 10, and thus may indicate a maximum revenue which power generation system 10 can generate in the second operating mode. Where customer demand exceeds the power output and/or load capacity of the first operating mode, shifting to the second operating mode may increase the economic benefit. The load output can also be specific to an increased output or burden on a particular part in the second operating mode, and may be calculated and/or expressed in terms of one or more part-specific outputs. In addition, the calculated operating condition may include a turndown ratio and/or startup speed of power generation system 10. The start up speed generally refers to the rate at which power generation system 10 transitions between two loads. The turndown ratio denotes a range of flow speeds in which a flow meter (i.e., a part within power generation system 10) can provide measurements with acceptable accuracy. The turndown ratio and startup speed may affect the flexibility of power generation system 10, with more flexibility being valuable when actual or predicted customer demands fluctuates over time. These start up and/or turn down rates may apply to the entire power generation system 10 and/or one or more specific parts. Furthermore, the operating condition of power generation system 10 may include a part-specific start up demand for determining expected replacement costs for parts with an increased or decreased burden in the second operating mode. The operating conditions may be correlated to increases or decreases in revenue by algorithms, look-up tables, and other types of mathematical relationships defined in optimization system 206. In an example scenario, increasing the peak load of power generation system 10 by fifteen MW may cause $10 per hour in additional degradation to one or more components of power generation system 10.

Controller 102 can obtain the relevant geographic location 150 (FIG. 5) of power generation system 10 in step S3-4. As used herein, the term "obtain" can refer to identifying, accessing, copying or otherwise referring to data predefined in another computer system, a storage system, or other arrangement of components. In addition, the term "obtain" can refer to calculating a particular quantity from other variables stored within controller 102 or other systems in communication with controller 102. Geographic location 150 may influence the economic benefit of operating power generation system 10 in the second operating mode because of factors such as the presence or absence of alternative power generation systems. Operator 110 and/or servicer 120 may tie one or more multiplying factors to the geographic location of power generation system 10 to reflect its relative economic importance. The geographic location of power generation system 10 may be relevant where multiple power generation systems operate in geographic location 150 which may be suitable substitutes in the event of a demand spike, an unforeseen outage, etc. Data associated with geographic location 150 can also include multiplier values for the economic benefit and/or billing rate per unit of time. Depending on location-specific risks (e.g., environmental factors) or costs (e.g., taxes or availability of replacement parts), the costs and/or benefits of increasing the load on parts of power generation system 10 can be multiplied by the multiplier values for the system at geographic location 150. For example, geographic location 150 of power generation system 10 may cause replacement parts to cost 1.1 times as much money to obtain and install relative to average conditions.

In step S3-5, modules 232 can obtain one or more of the factors calculated or obtained in steps S3-1-S3-3 and/or convert these factors into a total dollar value or a dollar value per unit of time. The dollar value can represent the economic benefit to operator 110 and/or servicer 120 for operating power generation system 10 in the second operating mode. The economic benefit can be an arithmetic total of the projected economic gains and/or losses for shifting power generation system 10 to the second operating mode, as an average or expected gain (e.g., a net present value) or a projected revenue increase over time for operating power generation system 10 in the second operating mode. For example, the total power generation demand calculated in step S3-1 may be approximately equal to $5,000 per day for the area serviced by power generation system 10 (i.e., 20 cents per kilowatt hour multiplied by 1.15 kilowatt hours per day multiplied by approximately 2170 customers in the serviced area). In the first operating mode, power generation system 10 may be able to meet $4,500 of this demand, but may meet the entire $5,000 of demand in the second operating mode, for a gain of $500. The cost of providing this additional power may be $260 per day in fuel costs, and $60 of maintenance costs. The additional $500 in revenue may also be subject to a $10 tax for the geographic location of operation. In this example scenario, the economic benefit would be equal to $170 per day (i.e., the various costs subtracted from the gain of $500).

Following process P3 of calculating the economic benefit for the second operating mode, optimization system 206 can also calculate a billing rate per unit of time based on the economic benefit calculated in process P3 and/or other relevant factors. As discussed elsewhere herein, the billing rate per unit of time can be a charge paid from operator 110 to servicer 120 for realizing the economic benefits of operating in the second operating mode, representing the share to servicer 120 for providing the opportunity for economic optimization. In step S4-1, modules 232 can obtain the calculated economic benefit, e.g., from economic benefit data field 322, in order to compute a share of profit to servicer 120. The share of profit to servicer 120 may be a fixed or variable percentage of the economic benefit to operator 110. In addition or alternatively, the share of economic allocated to servicer 120 may be only part of the projected billing rate per unit of time calculated in process P4. The various steps described herein as being part of process P4 can be performed independently or in combination.

In step S4-2, modules 232 can determine one or more differences between the first operating mode and the second operating mode. These differences may be expressed in terms of respective operating conditions (i.e., one or more of the example operating conditions discussed herein) for the two modes. For example, modules 232 can calculate the increase in power output between the first operating mode and the second operating mode, an increase or decrease in wear rate on one or more parts maintained or supplied by servicer 120 (FIG. 5) of power generation system 10 in the second operating mode, increases or decreases in efficiency, total cost of fuel relative to alternative power generation systems, changes to frequency and amplitude, and/or any increases or decreases in operating flexibility in the second operating mode as compared to the first operating mode. These differences may reflect risks assumed by servicer 120 (FIG. 5) for the second operating mode, such as an increased inventory demand and/or likelihood servicing power generation system 10 due to changing the burden on the system and its parts.

In step S4-3, modules 232 can obtain a predetermined cost differential, which may be included as part of the billing rate per unit of time. An agreement between operator 110 (FIG. 5) and servicer 120 (FIG. 5) may specify a predetermined minimum billing rate per unit of time ("cost differential") representing a service charge for allowing economic optimization of power generation system 10 according to embodiments of the present disclosure. Thus, modules 232 can obtain this predetermined cost differential in step S4-3 for inclusion with the billing rate per unit of time where applicable. For example, the predetermined cost differential obtained in step S4-3 can be a fixed fee of $50 per hour of operation in the second operating mode or alternatively can be a percentage between 0% and 100% of the net economic benefit obtained in step S4-1.

In step S4-4, modules 232 can also calculate one or more "system health metrics" for power generation system 10. A system health metric refers to any type of measurement of the condition of power generation system 10. As discussed elsewhere herein, system health monitor 140 can include machinery such as a boroscope for optically measuring variables such as clearance or material deformation, a stress/strain gauge for monitoring the condition of materials, a thermometer for measuring the internal temperature of power generation system 10, etc. Controller 102 can convert system health metrics 140 into a system health cost per unit of time from system health metric data field 330 stored on or received from system health monitor 140. One or more system health metrics measured and/or derived with system health monitor 140 can be factored into the billing rate per unit of time. For example, system health monitor 140 can measure or determine the "start-up reliability" for power generation system 10, which can represent a percentage of successful start ups and/or a failure or malfunction rate of power generation system 10 during start up or other transition phases. The definition of a successful start up can be predetermined by operator 110 (FIG. 5) and/or servicer 150 (FIG. 5), and can broadly include any start up time, start up speed, etc. which falls within a margin of error for the desired operating profile. The system health metric can also include, e.g., a parts condition expressed in terms of a dollar value of one or more parts and a rate of economic decline during use of power generation system 10 in the first operating mode and/or the second operating mode. A system health metric can also be expressed as a fuel consumption rate or a "power generation efficiency" representing an amount of power produced per unit of fuel used. The power generation efficiency can be defined as the amount of power generated per unit of fuel consumed, whether with respect to the entire power generation system or a single part. The power generation efficiency may increase or decrease depending on the condition of power generation system 10 or its parts. In an illustrative example, power generation system 10 may be designed to operate at 40% efficiency, thereby producing approximately 1,258 BTU of energy from each 3,145 BTU generated in a combustion reaction. The cost of purchasing the fuel may be, e.g., $4.52 per each million BTUs generated. As the power generation efficiency decreases, the costs of generating power with the same amount of fuel increases. System health monitor 140 may calculate, e.g., a decrease in efficiency based on the amount of energy generated per unit of fuel combusted. Controller 102 can convert this percentage decrease in efficiency to a monetary amount by multiplying the efficiency loss by the cost of fuel. In addition or alternatively, the system health metric can include a malfunction diagnosis (e.g., a summary of an actual or suspected problem) entered manually or automatically by system diagnostic software, which can be stored in system health monitor 140 and/or system health metric data field 330.

Following the calculation, obtaining, determining, etc., of factors in one or more of steps S10-S13 and their conversion to monetary values, modules 232 of optimization system 206 can calculate the billing rate per unit of time from one or more of these factors in step S4-5. The billing rate per unit of time can reflect predetermined terms and conditions between operator 110 (FIG. 5) and servicer 120 (FIG. 5) and/or relevant costs such as accelerated or decelerated degradation of power generation system 10 or its parts which servicer 120 (FIG. 5) would bear. The billing rate per unit of time calculated in step S4-5 can also be based in part on the economic benefit calculated in step S3-5 (i.e., obtaining the economic benefit in step S4-1) to provide a share of profit to servicer 120 (FIG. 5). The billing rate per unit of time can be a sum of the various factors discussed herein after their conversion to dollars per unit of time, or can be calculated by relationships defined in an algorithm, look-up table, etc. In one example, the billing rate per unit of time can be the sum of a predetermined cost differential of $70 per day as determined as a fraction of the total economic benefit (e.g., approximately 40% of the total economic benefit), a $30 per day cost increase for operating power generation system 10 above its predetermined limits, and a $10 system health cost from lost efficiency, which can be summed together to result in a $110 billing rate per day of operation in the second operating mode. As discussed herein, optimization system 206 can generate an economic impact vector in step S5 after processes P3 and P4 are complete. In addition or alternatively, these items of data can be stored in separate fields. For example, the calculated economic benefit can be stored as economic benefit data field 322 and the billing rate per unit of time can be stored in billing rate data field 324.

Returning to FIGS. 6 and 7, together, further steps according to the present disclosure are shown. In step S5, modules 232 of economic optimization engine 106 can combine the economic benefit calculated in process P3 with the billing rate per unit of time calculated in process P4 to generate an economic impact vector. The generated economic impact vector(s) may be stored in economic impact vector field 326 (FIG. 5). The economic impact vector generated in step S5 may be in a vector format which integrates several related items of data. For instance, the economic impact vector can include the calculated economic benefit, billing rate per unit of time, and other related items of data such as a summary of the second operating mode (including, e.g., values of peak load, base load, start up rate, etc.). Continuing with the previous example, the economic impact vector can be a single data field which includes the characteristics of the second operating mode, the $170 per day of economic benefit to operator 110, and the $110 billing rate per day to servicer 120 for operating in the second operating mode. The economic impact vector may also include the individual costs and economic benefits calculated in steps S3-1-S3-4 and S4-1-S4-4. Generating the economic impact vector in step S5 can also include generating multiple economic impact vectors for respective alternative operating modes for power generation system 10. The economic impact vector generated in step S5 can be stored in one or more locations for later access, such as memory 212, storage system 214, and/or servicer database 310.

The operator of power generation system 10 (e.g., operator 110 (FIG. 5)) may desire to shift power generation system 10 to the second operating mode when the calculated economic benefit from process P3 is positive and/or the calculated billing rate per unit of time from process P4 is within the budget of operator 110 (FIG. 5). In step S6, operator 110 (FIG. 5) can submit a request to controller 102 to operate in the second operating mode. The request may be in the form of a control signal, command to optimization system 206, and/or any other type of encoded request submitted with I/O device 218. In step S7, one module 232 can determine whether the economic benefit calculated in process P3 is a positive economic benefit. A positive economic benefit can include, e.g., a net economic gain per unit of time of operation in the second operating mode, a net economic gain for operating in the second operating mode over a particular time period, an average or expected income after shifting power generation system 10 to the second operating mode, etc. The net economic gain can be calculated according to the principles and/or examples discussed herein, and may be converted from a benefit for each day in the second operating mode to a statistical average, median, etc. by modules 232 calculating the economic benefit for several days and mathematically converting these values into a mean value, a median value, a mode value (i.e., most frequent value), etc. In the event that modules 232 determine that the calculated economic benefit for the second operating mode is not a positive economic benefit (i.e., "no" at step S7), modules 232 in step S8 can notify operator 110 (FIG. 5) that the request to shift power generation system 10 to the second operating mode offers no economic benefit and is refused. This notification can be delivered though I/O device 218 in the form of text messages, sound cues, and/or other types of audio/visual or sensory feedback to operator 110 (FIG. 5).

In response to the economic benefit being a positive economic benefit to operator 110 (FIG. 5) and/or servicer 120 (FIG. 5), the process flow can proceed to step S9, where controller 102 relays the request to servicer 120 (FIG. 5) to operate power generation system 10 in the second operating mode. The request can be encoded and communicated as a control signal to an independent system and/or stored in request data field 328 accessible to servicer 120 (FIG. 5). In step S9, the request can be communicated from operator 110 (FIG. 5) to servicer 120 (FIG. 5) by any currently known or later developed communications system, e.g., a local area network (LAN) or a wide area network (WAN), or the connection may be made to an external computer (for example, through the Internet using an Internet Service Provider).

After reviewing the operator's request to operate in the second operating mode, servicer 120 (FIG. 5) can send a return signal to controller 102 and/or operator 110 (FIG. 5) to deny or accept the request. This acceptance or refusal by servicer 120 (FIG. 5) can occur independently of the process flow steps discussed herein as being carried out in controller 102. Servicer 120 (FIG. 5) can deny the request based on, e.g., the net economic benefit for one party not being a positive return for either operator 110 (FIG. 5) or servicer 120 (FIG. 5), even if the total economic benefit calculated in P3 is positive. In addition, servicer 120 (FIG. 5) can deny the request for other reasons, such as operator 110 (FIG. 5) having failed to pay servicer 120 (FIG. 5) for other services or the billing rate per unit of time calculated in P4 being too low with respect to any associated risks. Servicer 120 (FIG. 5) can manually submit an approval or denial to controller 102, or can do so automatically through computations, algorithms, etc. stored within independent computer systems in communication with controller 102. In step S10, modules 232 can determine whether controller 102 has received approval from servicer 120 (FIG. 5) to operate in the second operating mode. In any event, controller 102 can notify operator 110 (FIG. 5) in step S8 that the request is refused in response to a denial being received from servicer 120 (i.e., "no" at step S10). The notification provided in step S8 may also be accompanied by an explanation for the refusal provided from servicer 120 (FIG. 5) (e.g., communicating one or more of the example reasons set out above). Following the refusal, power generation system 10 can continue to operate in the first operating mode (i.e., step S1) until a future opportunity arises.

Where controller 102 has received an approval from servicer 120 (FIG. 5) to operate in the second operating mode (i.e., "yes" at step S10), controller 102 can shift power generation system 10 to the second operating mode in step S11. The operating of power generation system 10 in the second operating mode can include changing various attributes (peak value, start up speed, fuel consumption rate per time, etc.) to shift power generation system 10 from the first operating mode to the second operating mode. To shift power generation system 10 to the second operating mode, controller 102 can send a control signal to electronically controlled parts of power generation system 10 (valves, switches, fuel intake lines, adjustable couplings between load bearing components and other parts, etc.) to modify aspects (i.e., air-to-fuel ratio, maximum values of load, gear ratios, fuel intake rates, etc.) of power generation system 10. As discussed elsewhere herein, the modified aspects of power generation system 10 can include, e.g., the base load, peak load, start up rate or rate of change between different modes, etc., to influence the performance of power generation system 10. In addition or alternatively, controller 102 can shift power generation system 10 to the second operating mode by manipulating ICS 104. Power generation system 10 can continue to operate in the second operating mode for any length of time until the second operating mode is canceled by either operator 110 (FIG. 5) or servicer 120 (FIG. 5) in step S12. To cancel the second operating mode, controller 102 can send a control signal to power generation system 10 after receiving a cancellation request from operator 110 (FIG. 5), servicer 120 (FIG. 5), and/or another party or system in communication with controller 102. Where modules 232 have determined that no cancellation request has been submitted to controller 102 (i.e., "no" at step S12), power generation system 10 can continue to operate in the second operating mode without changing any of the attributes corresponding with different operating modes. Where modules 232 determine that a cancellation request has been submitted to controller 102 (i.e., "yes" at step S12), controller 102 can shift power generation system 10 back to the first operating mode by, e.g., issuing further control signals to power generation system 10 or ICS 104, thereby ceasing operation in the second power generation mode in favor of the first operating mode.

As used herein, the term "configured," "configured to," and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power generation system comprising:
a controller communicatively coupled to the power generation system and configured to shift the power generation system from a first operating mode to a second operating mode, the second operating mode having a different peak load, base load, and load rate from the first operating mode, wherein the first operating mode and the second operating mode of the power generation system use a same power source; and
an economic optimization engine in communication with the controller, wherein the economic optimization engine calculates:
an economic benefit for shifting the power generation system from the first operating mode to the second operating mode based on a power generation demand, a power generation cost, and an operating condition of the power generation system; and
a billing rate per unit of time of operation in the second operating mode based on the economic benefit, an operating difference between the first operating mode and the second operating mode, and a predetermined cost differential,
wherein the controller shifts the power generation system from the first operating mode to the second operating mode in response to the economic benefit for shifting the power generation system from the first operating mode to the second operating mode being greater than an economic benefit of continuing the first operating mode, and wherein the controller shifting the power generation system from the first operating mode to the second operating mode adjusts a controllable component of the power generation system to yield continued operation of the power generation system in the second operating mode with the different peak load, base load, and load rate.

2. The power generation system of claim 1, wherein a start up speed and a part-specific load of the second operating mode are different from a start up speed and a part-specific load of the first operating mode.

3. The power generation system of claim 1, wherein the operating condition of the power generation system includes at least one of a load output, a part-specific output, a part-specific turndown ratio, a projected start up speed, and a part-specific start up demand of the power generation system.

4. The power generation system of claim 1, wherein the second operating mode includes one of a base load operation, a reduced base load operation, a peak load operation, and a load following operation of the power generation system.

5. The power generation system of claim 1, wherein the power generation cost includes a fuel cost, a cost difference between a fuel unit cost for the power generation system and an alternative power generation unit cost, a location-specific operating cost, and a part-specific operating cost.

6. The power generation system of claim 1, wherein the economic optimization engine further calculates the economic benefit for shifting the power generation system from the first operating mode to the second operating mode based on:
identifying a geographic location of the power generation system; and
multiplying the economic benefit for shifting the power generation system from the first operating mode to the second operating mode by a multiplier associated with the geographic location, the multiplier being derived from at least one of an inventory limit, a labor cost, or a schedule restriction at the geographic location.

7. The power generation system of claim 1, further comprising an activation module in communication with the controller, the activation module being configured to enable or disable shifting of the power generation system from the first operating mode to the second operating mode.

8. The power generation system of claim 1, wherein the controller is further configured to select one of a plurality of second operating modes based on the economic benefit and the billing rate per unit time, and shift the power generation system to the selected one of the plurality of second operating modes.

9. The power generation system of claim 1, further comprising a computing device coupled to the controller and configured to monitor a system health metric of the power generation system, the system health metric including one of a start-up reliability, a parts condition, and a malfunction diagnosis, wherein the billing rate per unit of time is further based on the system health metric.

10. The power generation system of claim 9, further comprising a servicer database in communication with the computing device, the servicer database including the system health metric and being accessible to the servicer of one of the power generation system and the apparatus.

11. A method for economic optimization of a power generation system, the method being implemented with a processing unit of a computing device and comprising:
operating a power generation system in a first operating mode having a corresponding peak rate, base load, and load rate;
calculating an economic benefit of shifting a power generation system from the first operating mode to a second operating mode, the second operating mode being different from the first operating mode, wherein the economic benefit is based on an operating condition of the power generation system, a power generation demand, and a power generation cost;
shifting the power generation system from the first operating mode to the second operating mode in response to the economic benefit for shifting the power generation system from the first operating mode to the second operating mode being greater than an economic benefit of continuing the first operating mode, wherein the shifting includes adjusting a controllable component of the power generation system to yield continued operation of the power generation system in the second operating mode with a different peak load, base load, and load rate relative to the peak rate, base load, and load rate of the first operating mode;
calculating a billing rate per unit of time of operating the power generation system in the second operating mode based on the economic benefit, an operating difference between the first operating mode and the second operating mode, and a predetermined cost differential; and
generating an economic impact vector for integrating the economic benefit and the billing rate per unit of time with a summary of the second operating mode.

12. The method of claim 11, wherein a start up speed and a part-specific load of the second operating mode are different from a start up speed and a part-specific load of the first operating mode.

13. The method of claim 11, wherein the shifting of the power generation system to the second operating mode from the first operating mode adjusts a load output, a part-specific output, a part-specific turndown ratio, a projected start up speed, and a part-specific start up demand of the power generation system.

14. The method of claim 11, wherein the second operating mode includes one of a base load operation, a reduced base load operation, a peak load operation, and a load following operation of the power generation system.

15. The method of claim 11, wherein the power generation cost includes one of a fuel cost, a cost difference between a fuel unit cost for the power generation system and an alternative power generation unit cost, a location-specific operating cost, and a part-specific cost.

16. The method of claim 11, wherein the calculating of the economic benefit is further based on:
identifying a geographic location of the power generation system; and
multiplying the economic benefit for shifting the power generation system from the first operating mode to the second operating mode by a multiplier associated with the geographic location, the multiplier being derived from at least one of an inventory limit, a labor cost, or a schedule restriction at the geographic location.

17. The method of claim 11, further comprising:
sending a request to a servicer of the power generation system to shift the power generation system to the second operating mode; and
shifting the power generation system to the second operating mode in response to the economic benefit being a positive economic benefit and the request being approved.

18. The method of claim 11, further comprising selecting one of a plurality of second operating modes of the power generation system based on the economic benefit and the billing rate per unit time, and wherein the shifting includes shifting to the selected one of the plurality of second operating modes.

19. The method of claim 11, wherein the calculating of the billing rate per unit of time is further based on a system health of the power generation system, the system health being derived from measurements by a start-up reliability monitor, a parts condition monitor, a malfunction diagnostic monitor, a productivity monitor, and a fuel consumption monitor.

20. A program product stored on a non-transitory computer readable storage medium for economic optimization of a power generation system, the computer readable storage medium comprising program code for causing a computer system to:
operate a power generation system in a first operating mode having a corresponding peak rate, base load, and load rate;
calculate an economic benefit of shifting the power generation system from the first operating mode to a second operating mode, the second operating mode being different from the first operating mode, wherein the economic benefit is based on an operating condition of the power generation system, a power generation demand, and a power generation cost;
shift the power generation system from the first operating mode to the second operating mode in response to the economic benefit for shifting the power generation system from the first operating mode to the second operating mode being greater than an economic benefit of continuing the first operating mode, wherein shifting to the second operating mode includes adjusting a controllable component of the power generation system to yield continued operation of the power generation system in the second operating mode with a different peak load, base load, and load rate relative to the peak rate, base load, and load rate of the first operating mode;
calculate a billing rate per unit of time of operating the power generation system in the second operating mode based on the economic benefit, an operating difference between the first operating mode and the second operating mode, and a predetermined cost differential; and
generate an economic impact vector for integrating the economic benefit and the billing rate per unit of time with a summary of the second operating mode.

* * * * *